UNITED STATES PATENT OFFICE.

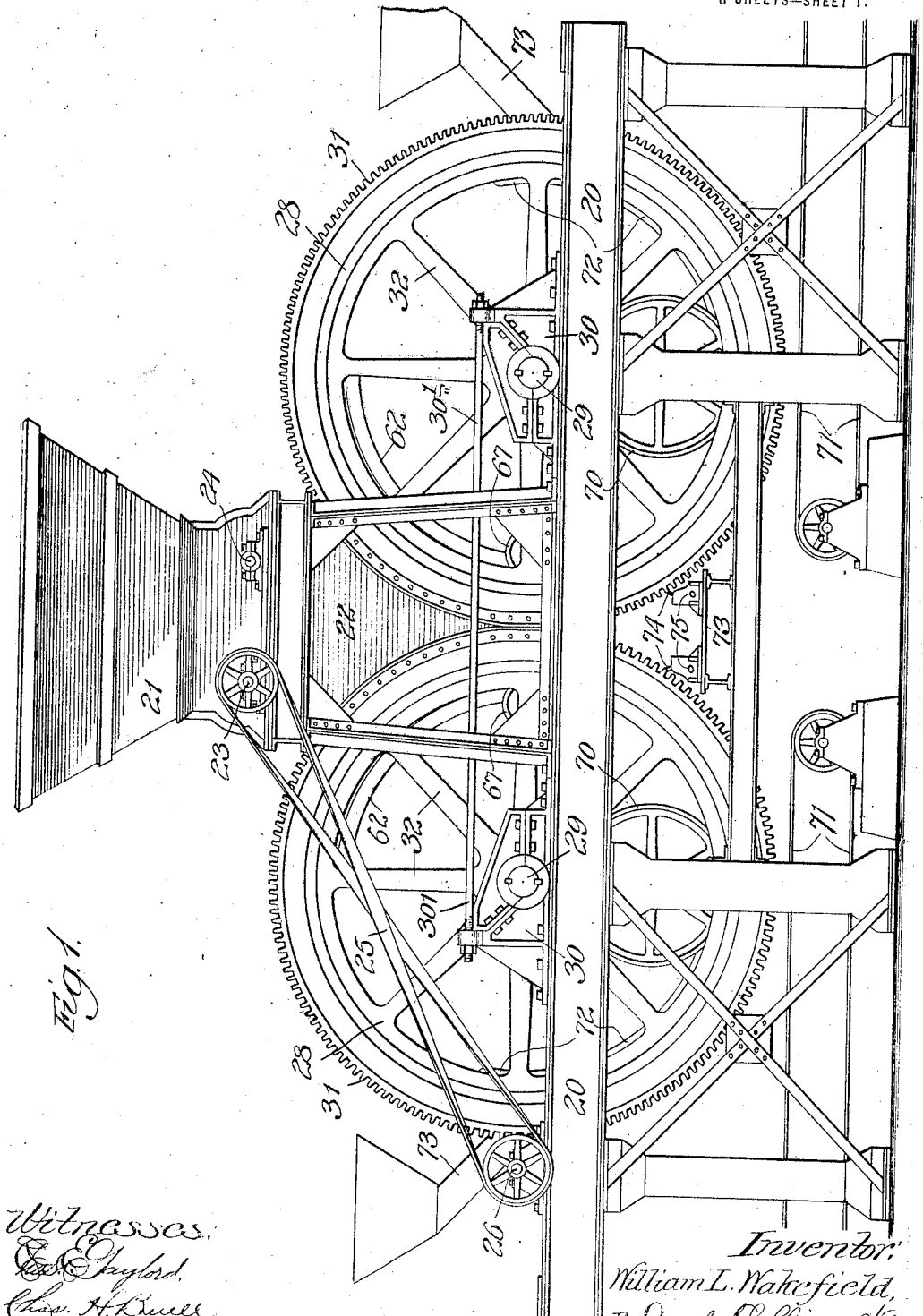

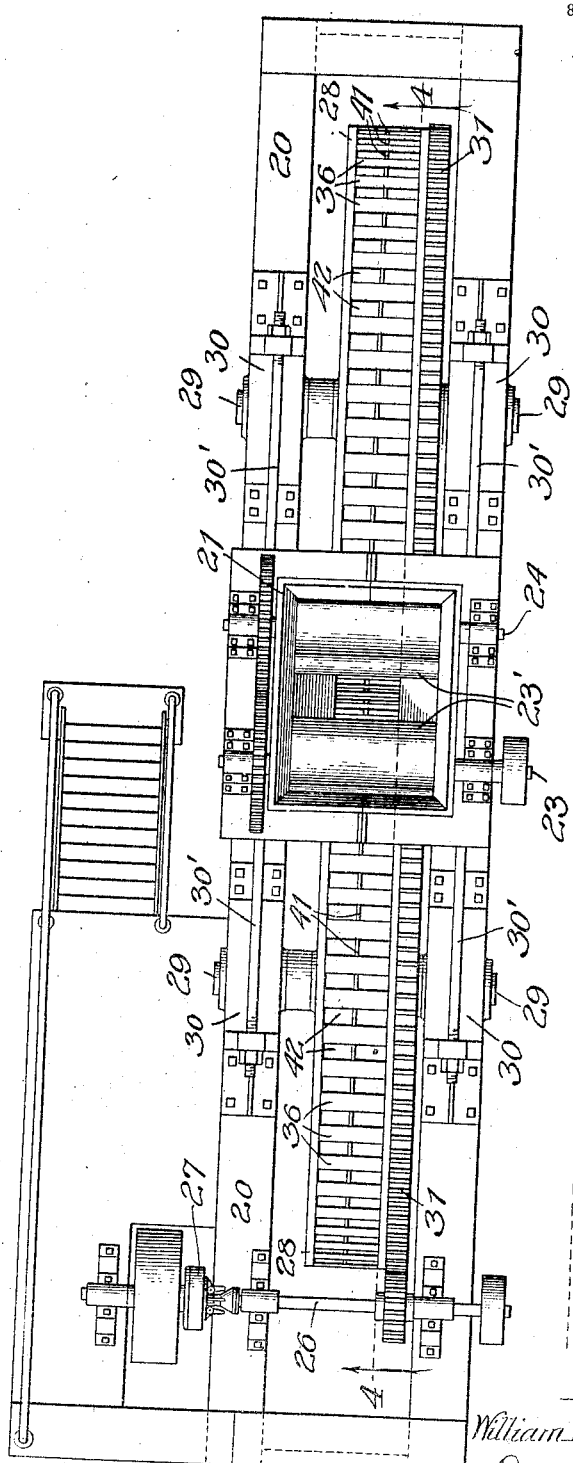

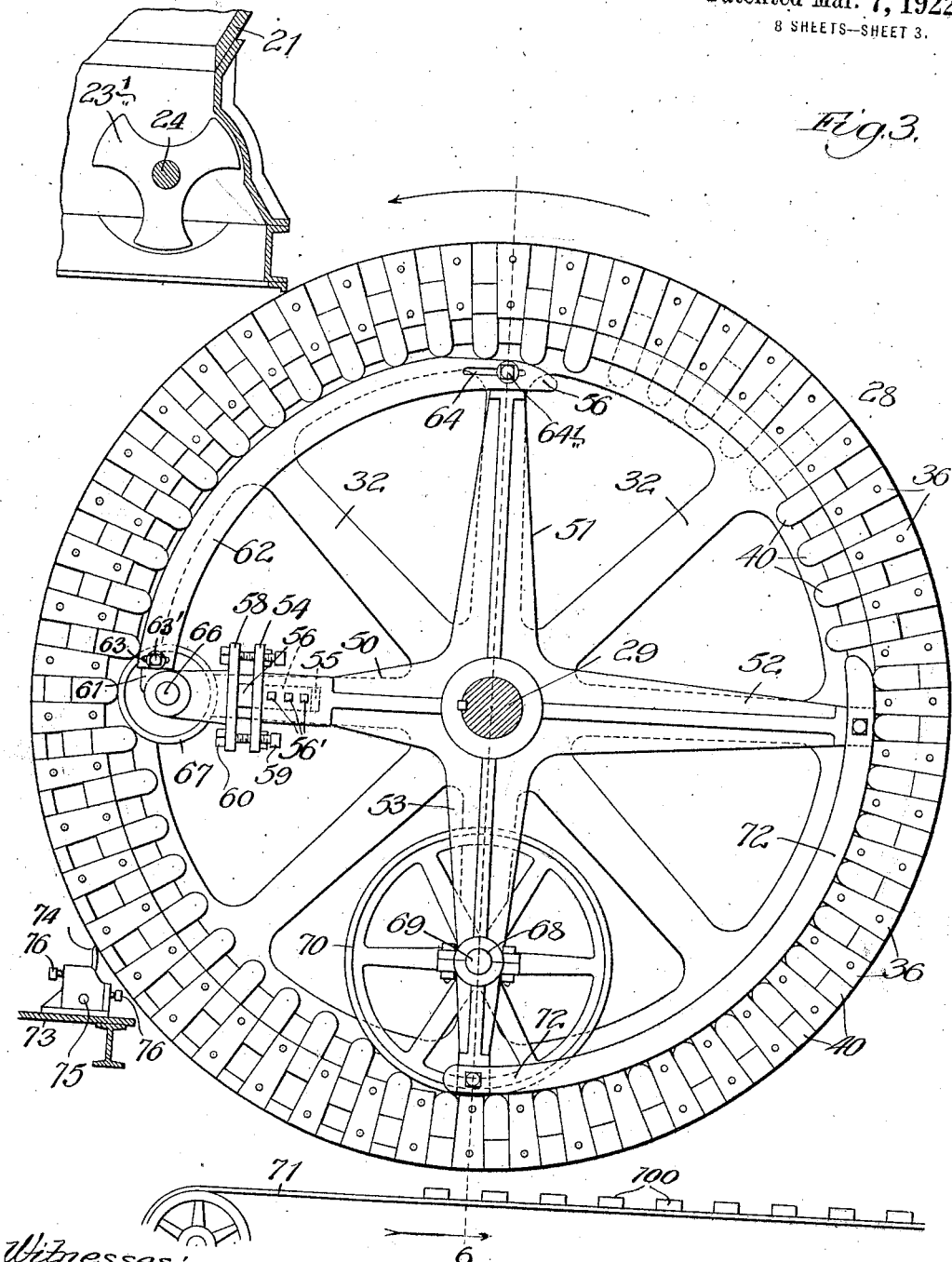

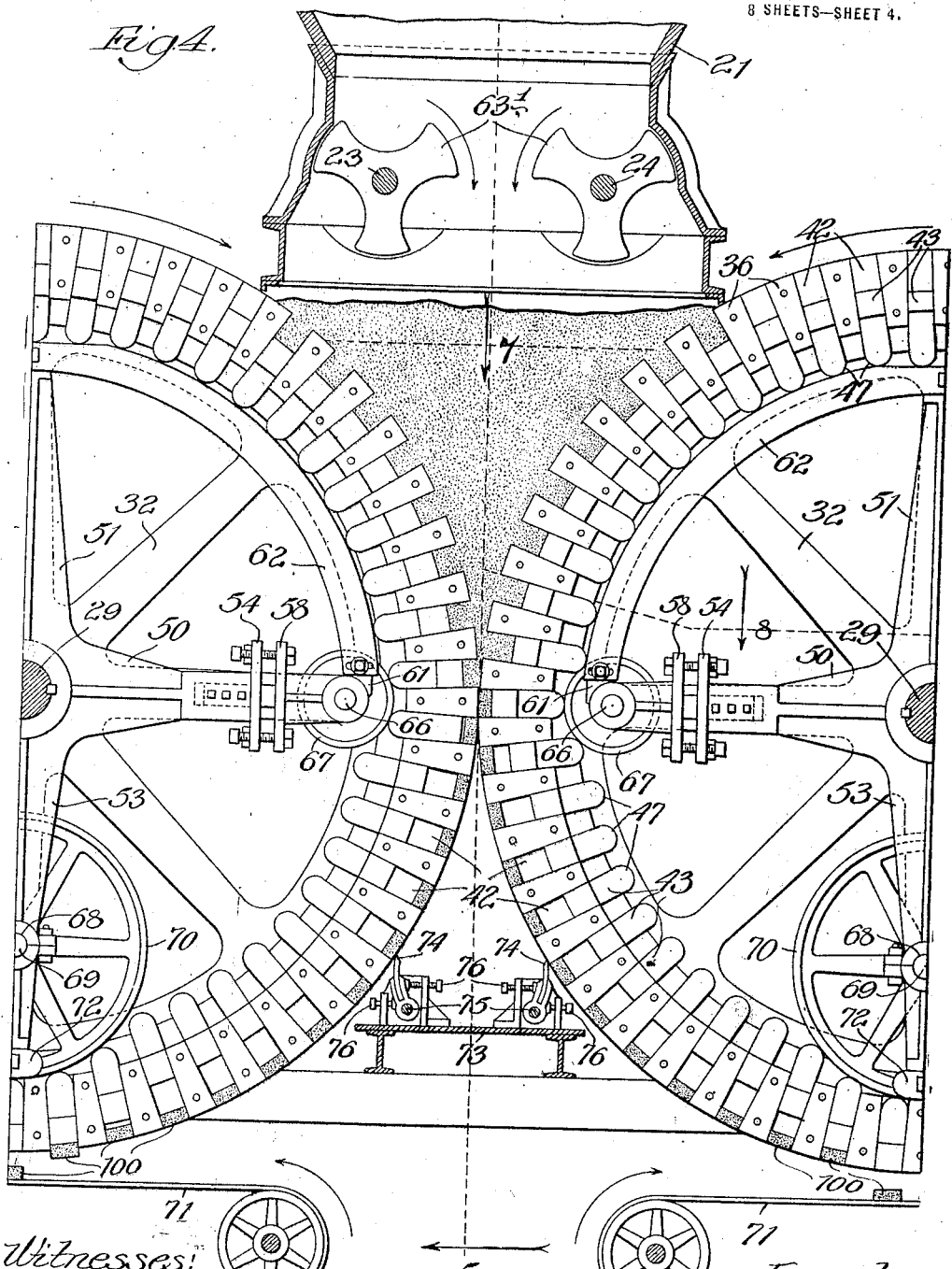

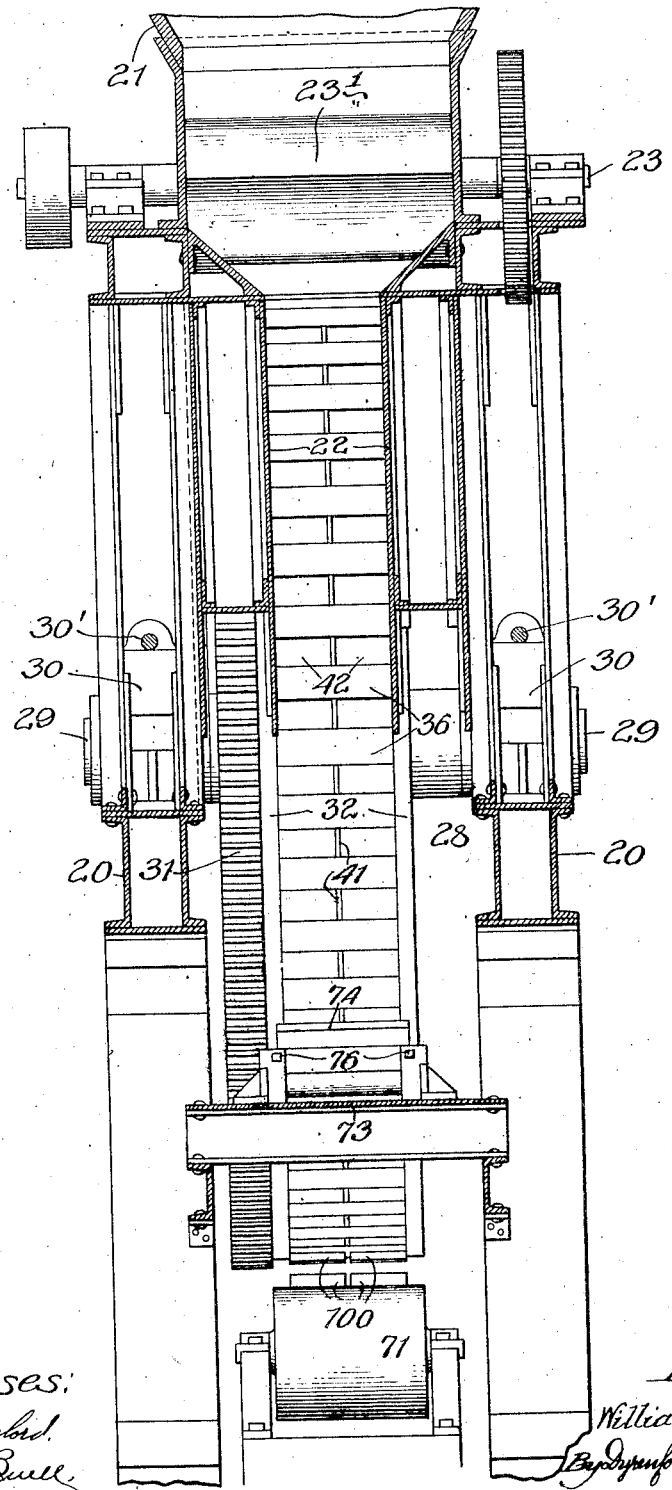

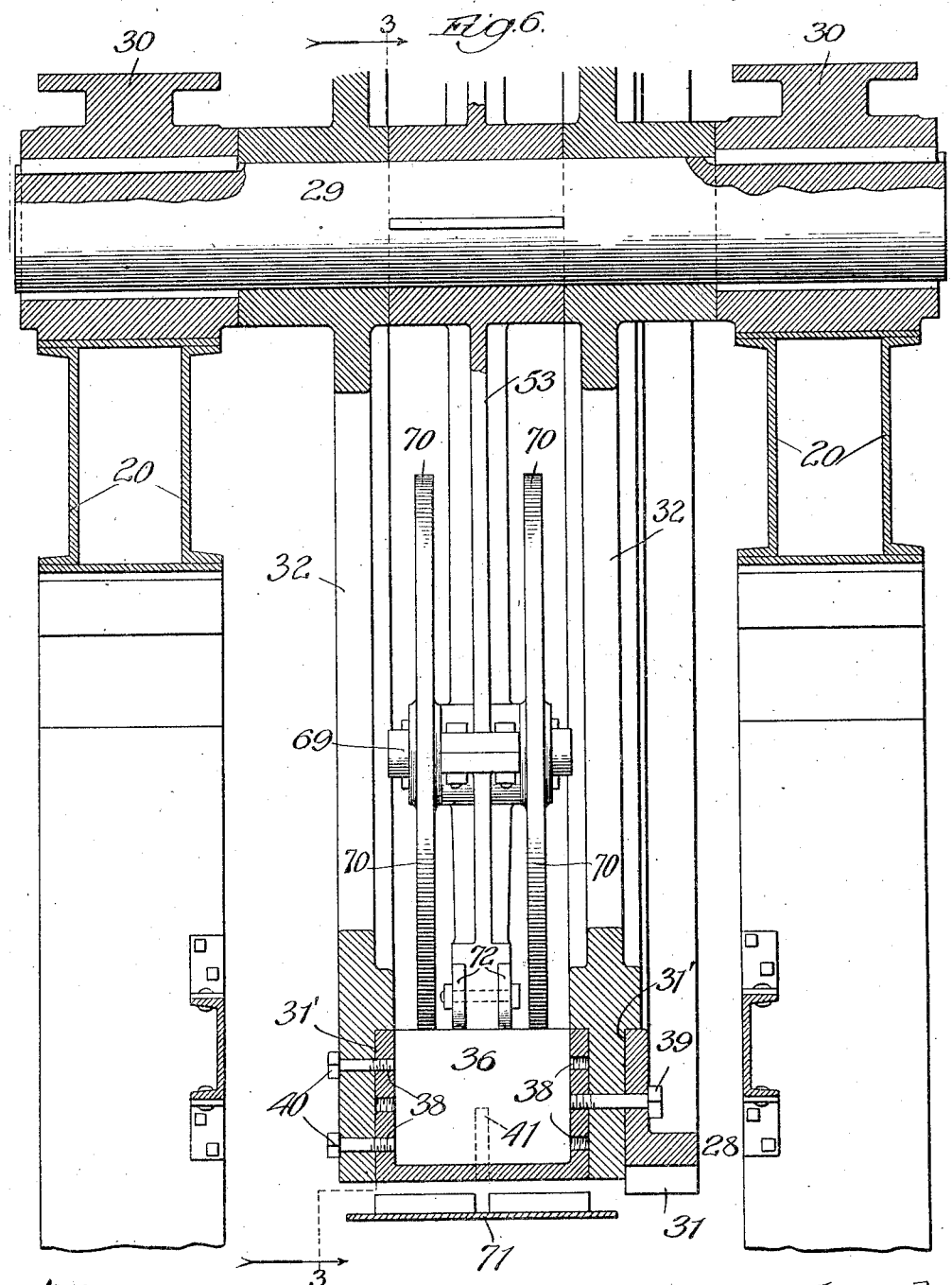

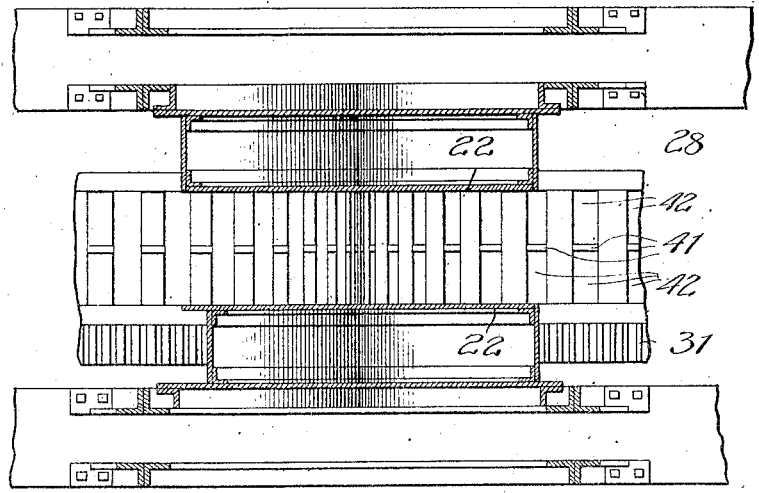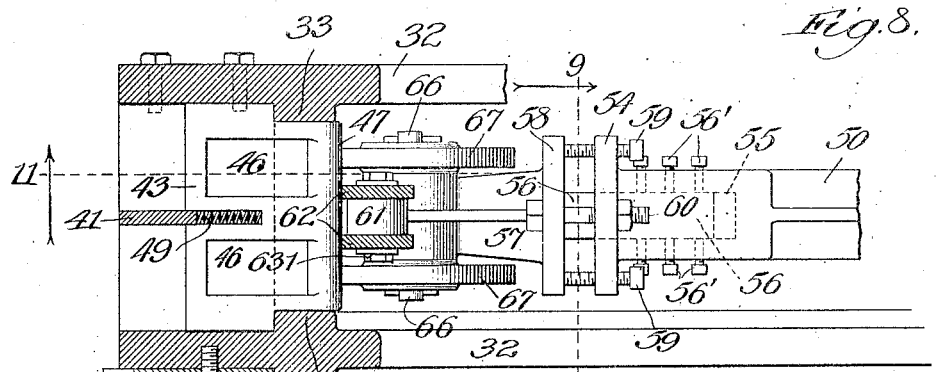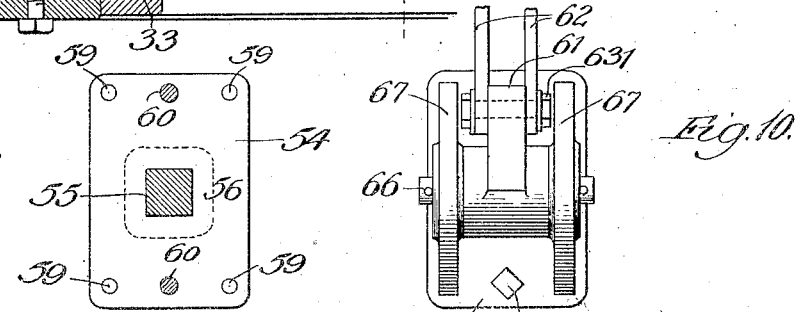

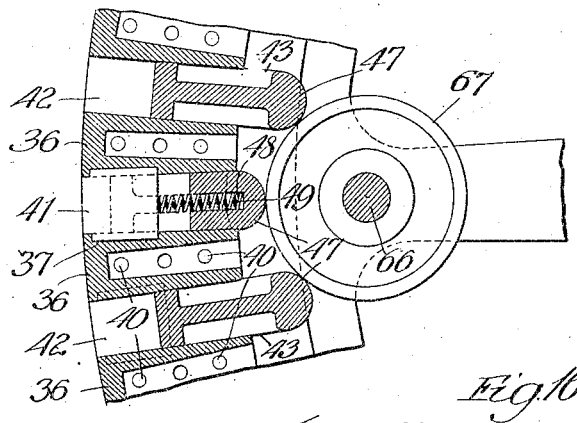
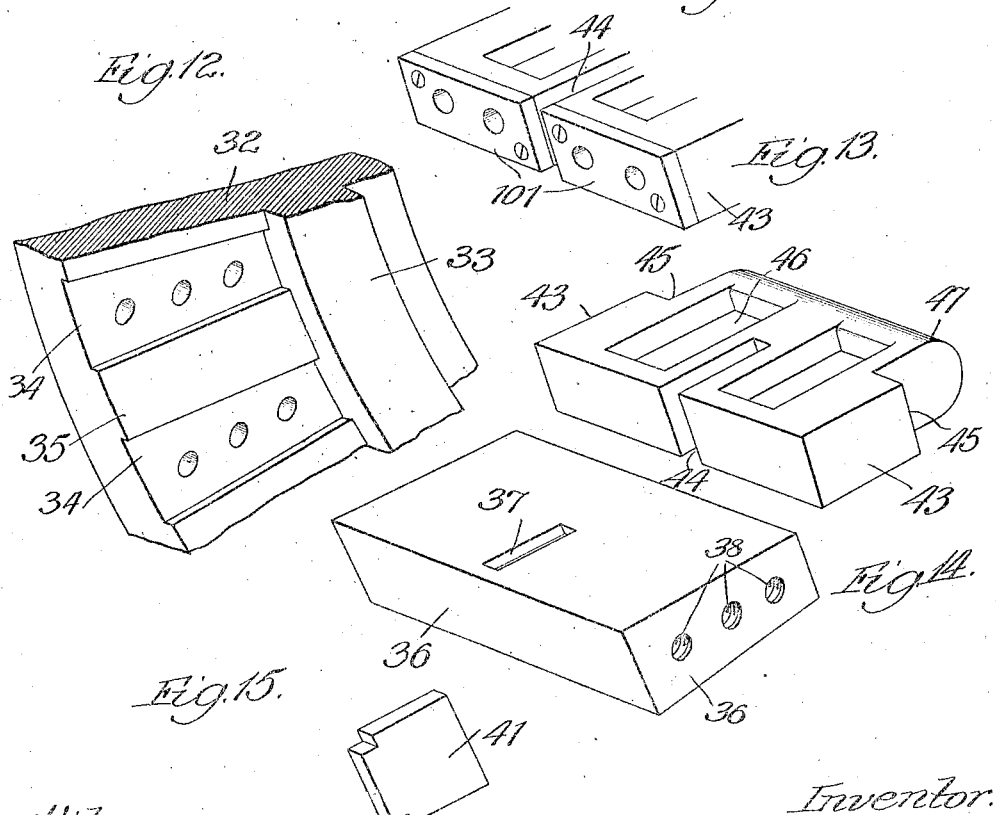

WILLIAM L. WAKEFIELD, OF CANTON, OHIO.

BRICKMAKING MACHINE AND PROCESS.

1,408,550.

Specification of Letters Patent.

Patented Mar. 7, 1922.

Application filed March 31, 1920. Serial No. 370,169.

*To all whom it may concern:*

Be it known that I, WILLIAM L. WAKEFIELD, a citizen of the United States, residing at Canton, in the county of Stark and State of Ohio, have invented a new and useful Improvement in Brickmaking Machines and Processes, of which the following is a specification.

My invention relates to certain new and useful improvements in brick-making machines. The primary object of my invention is to provide a rotary machine capable of turning out a maximum quantity of stiff plastic bricks, free of lamination, and formed under a pressure sufficient to produce a high-grade brick. A further object of the invention is to produce a machine of this character which may be easily adjusted to form bricks of all common sizes varying from flat tile to paving bricks. A further object of the invention is to provide means by which the compression or the pressure used in forming the bricks may be varied independently of the size of the brick formed.

Other objects and advantages of my invention will be more fully understood from the following detailed description, taken in connection with the accompanying drawings, in which:—

Fig. 1 is a side elevation of a double rotary machine constructed in accordance with my invention; Fig. 2 is a top plan view of the same; Fig. 3 is an enlarged section through one of the drums of the machine, taken substantially on the line 3 of Fig. 6; Fig. 4 is an enlarged section through the central portion of the brick-forming drums and through the feed hopper, taken on the line 4 of Fig. 2; Fig. 5 is a section on the line 5 of Fig. 4; Fig. 6 is an enlarged section taken on the line 6 of Fig. 3; Fig. 7 is a section taken on the line 7 of Fig. 4; Fig. 8 is an enlarged section taken on the line 8 of Fig. 4, and showing the adjusting means for the pressure wheels; Fig. 9 is a detailed section of the end of the pressure-wheel supporting-arm, taken on the line 9 of Fig. 8; Fig. 10 is a front elevation of the pressure wheel shown in Fig. 8, showing the method in which the quadrant bars are attached to the pressure-wheel supporting-arm; Fig. 11 is a section through the brick-forming drum, taken on the line 11 of Fig. 8; Fig. 12 is an enlarged detail perspective view of the inside face of one of the drum-wheels; Fig. 13 is an enlarged perspective view of one of the brick-forming plungers; Fig. 14 is a similar perspective view of one of the spacing sectors which are interposed between the plungers; Fig. 15 is a similar perspective view of one of the partition plates which divides the brick-pocket into two parts, and Fig. 16 is an enlarged perspective view of the end of the brick-forming plunger showing a pair of die-plates fastened thereto for forming lugs upon the inner faces of the bricks.

For mounting my machine I provide a suitable frame 20 elevated above the ground and having its supporting structure properly braced, as shown in the drawings. Suitable columns mounted on this frame carry above the same a hopper 21 to which the properly tempered clay is supplied by any suitable means, and which serves as a reservior the supplying the machine. The hopper 21 discharges at its lower end into a feed-box 22 and in order that the feed-box may be kept constantly filled and the clay therein under sufficient pressure to flow into the brick-forming molds, or pockets, I provide a pair of deeply-grooved feeding cylinders 23', best shown in Fig. 4, which are mounted upon parallel horizontal shafts 23 and 24 which are geared together at the back, as shown in Fig. 2, and the former of which is driven as by a belt 25 from a main driving shaft 26 mounted transversely of the frame and controllable as through a clutch 27 of ordinary form. A pair of opposed rotary drums 28 are journaled upon stationary shafts 29 mounted horizontally in the frame and keyed to pillow-blocks 30, which may be tied together as by a tie-rod 30'. The drums 28 are geared together as by ring-gears 31 which are designed to be constantly driven from a pinion on the driving shaft 26, as shown in Fig. 2. Each of the drums 28 is made up of a pair of spaced wheels 32 journaled to turn freely on the shaft 29, as shown in Fig. 6. The opposing inner faces of each pair of the wheels 32 is formed as shown in Fig. 12, having an annular rib 33 from which lead outwardly parallel-walled radial grooves 34, which are spaced apart to leave alternate parallel-sided radial ribs 35, the ribs being of slightly greater width than the grooves 34. For securing the wheels 32 in proper spaced relation, as shown in Fig. 6, I provide a plurality of spacer blocks of the form shown in Fig. 14 and there designated by the numeral 36. The blocks 36 are preferably formed as cored castings, having closed upper ends and open lower ends, as shown in Fig. 11. Midway of the opposite lateral faces of each block, there is formed a recess 37, the opposing recesses of a pair of blocks being adapted to receive and secure a partition plate 41, as is best shown in Fig. 11. The spacer blocks 36 are secured between the opposed faces of the wheels 32 by any suitable means, such as the bolts 39, 40, shown in Fig. 6. The bolt 39 is preferably also used as a securing means for the ring-gear 31, the outside wheel 32 which carries this ring-gear being suitably grooved, as at 31', for this purpose. To receive the bolts 39, 40, the spacer block 36 is provided with suitable tapped bores 38, two being provided on the side into which the bolts 40 fit, and a single one on the side into which the bolt 39 fits.

The space between adjacent blocks 36, divided transversely by the partition plate 41, forms a double brick pocket 42 which is adapted to receive the plastic clay from the feed-box 22. Each of the brick pockets 42 receives and guides a plunger 43 which has a slot 44 extending inwardly from its front end to permit the plunger to move past the partition plate 41. The rear end of the plunger 43 is reduced in width, as shown at 45, to provide a shoulder which in the extreme inward position of the plunger bears against the outer face of the annular rib 35. The plungers are preferably formed as castings and may be lightened, as by recesses 46, which terminate short of the inner rounded ends 47 of the plungers. At the bottom of the slot 44 each plunger has a cylindrical bore 48 which is adapted to receive a coil compression spring 49 which bears at its outer end against the inner face of the partition plate 41, as shown in Fig. 11. Keyed upon the central portion of each of the stationary shafts 29 to lie between the spaced wheels 32 which form the drum, is a stationary spider having four arms, designated 50, 51, 52 and 53, occupying the relation shown in Figs. 3 and 4. The arm 50 is relatively short and has its outer end flanged outwardly, as shown at 54 in Fig. 8, and is further provided with an inwardly extending radial bore 55 preferably square in cross-section within which telescopes the reduced squared portion 56 of a pressure member 57. A plurality of set screws 56' may be used to secure the telescoping part 56 within the bore 55 and since the member 57 is designed to stand a considerable compression, as will later appear, additional securing means is provided in the form of four abutment screws or bolts 59 which are threaded through the corners of the flange 54 and bear against the opposed face of a flange 58 carried by the member 57. The abutment screws 59 serve as gauges by which the pressure member 57 may be adjusted relatively to the arm 50 and for securing the parts in any adjusted position, there is provided in addition to the set screws 56' tie-bolts 60 mounted in the upper and lower portions of the flanges 54, 58, as best shown in Fig. 9. The outer end of the pressure member 47 carries an upwardly extending lug 61 which supports a gauge quadrant comprising a pair of quadrant bars 62, having their lower ends provided with radial slots 63 through which a securing and adjusting bolt 63' passes, in order to bind the bars to the lug 61 in proper adjusted position. The upper ends of the quadrant bars 62 are supported from the vertical spider arm 51 by means of a bolt 64' which passes through upwardly and outwardly inclining slots 64 formed in the ends of the quadrant bars. These upper ends are tapered inwardly as shown at 65, in order to provide cam surfaces for forcing the plungers 43 outwardly as will later appear. Below the lug 61 the outer end of the pressure member 57 carries a horizontal shaft 66 on which are journaled a pair of pressure wheels 67 which are adapted to act upon the rounded rear or inner ends of the plungers 43 to positively force the latter outwardly, in order to apply the desired compression to the clay within the brick-forming pocket, as will later appear.

The downwardly extending spider arm 53 is split intermediate its length and as shown at 68 to clamp about a stationary shaft 69 which extends transversely of the spider arm and on its projecting end carries a pair of ejector wheels 70, which are adapted to roll against the rounded inner ends 47 of the plungers 43 and force the plungers to their extreme outward position, that is, until their outer faces are level with the surfaces of the drum, whereby a previously-formed brick is ejected from its pocket and delivered to a horizontal conveyor belt 71 which travels beneath each of the drums 28. Between the spider arms 53 and 52, there is mounted a sanding quadrant consisting of a pair of quadrant bars 72 secured on either side of the ends of the spider arms 52, 53. It is the function of this quadrant to maintain the plungers 43 in a position flush with the outer surface of the drum from the time they pass the ejector wheels 70 until after they have traveled beyond the sand-boxes 73, shown in Fig. 1. It will be understood that these sand-boxes have their function, customary in the art, of scouring and drying the surfaces of the drums and plungers to prevent the clay from adhering thereto during the brick-forming operation.

Between the drums 28 and directly below their point of contact, as shown in Fig. 4, the frame 20 carries a small platform 73 on which is mounted a pair of scraper-knives 74 which are adapted to contact with the surfaces of the drums to scrape from the same any excess of clay which may be adhering thereto. The knives 74 are mounted in carriers of the form shown in Fig. 4, which are pivoted upon rock-shafts 75 and held in proper adjusted position by means of upper and lower set screws 76. The operation of my machine is as follows:

The hopper 21 will be filled with a mass of stiff plastic clay, and the drive shaft 26 being operated from any suitable power source and the clutch 27 thrown into engagement, the feeding cylinders 23′ will turn in the direction indicated by the arrows in Fig. 4 to force the clay downwardly from the hopper into the feed-box 22, and to maintain the plastic mass under considerable pressure within this box. By means of this pressure the clay within the feed-box will be forced into the brick-forming pockets 42 of the drums 28, the amount of clay entering each pocket being determined by the positions of the plungers 43, as determined by the position of the gauge quadrant 62. It should be noted that in addition to the pressure exerted by the feed wheels 23′ the complete filling of the pockets 42 will be assisted by the movements of the drums themselves, these members exerting a wedging and forcing action upon the mass of clay as they approach the point of contact, as shown in Fig. 4. As each plunger 43 approaches the horizontal position, as viewed in Fig. 4, its rear rounded edge 47 will contact with the periphery of the pressure wheels 67 and by the continued movement of the plunger, it will be forcibly driven outward, thereby compressing the mass of clay within the pocket 42 against the face of the spacer block 36 of the opposite drum, the drums being so geared together as to cause each spacer block of one drum to roll against the pocket of the opposite drum. It should further be noted that the peripheral width of the spacer block is slightly greater than the width of the pocket, in order to provide the necessary overlap of the pressure surface and prevent the clay from flowing outwardly under the very high pressure imposed by the pressure wheels 67 and plungers 43. By the action just described each plunger 43 will operate to produce a pair of perfectly-formed and pressed or compacted bricks within the outer ends of the double pocket 42, as the pocket passes the horizontal or contacting position. Almost immediately after the pockets 42 have passed this horizontal or brick-forming position, the plungers 43 will ride off of the lower periphery of the pressure wheels 67, and by the action of the compression springs 49 will be forcibly withdrawn to their extreme inward position, leaving the finished brick, designated by the numeral 100 in the drawings, in the outer end of the pocket. This return of the plungers, after they have formed the bricks, I regard as an important feature of my invention in that by this means any vacuum seal which may have been formed by expressing the air between the plunger and the brick in the high compression to which the brick was subjected, will be broken, whereby in the later ejecting action of the plungers the bricks will drop freely therefrom instead of adhering thereto as has been found to be the case where adequate means was not provided for breaking this vacuum seal.

By the continued operation of the drums 28, the pockets bearing the previously-formed bricks will be brought in contact with the scraping knives 74, which are so adjusted as to lie flush with the surface of the drum, and by means of these knives any surplus clay which may adhere to the surfaces of the spacer-blocks 36, will be scraped or cut therefrom. After passing scraper knives 74, the pockets containing the formed and trimmed bricks will approach the ejector wheels 70, and by the action of the latter the plungers 43 will be pushed outwardly to the full limits of their strokes to positively eject the formed and trimmed bricks from the pockets 42 and deliver them to the conveyor belt 71, by which they will be carried to a drying oven or to a burning kiln, as may be desired.

The plungers having been forced to their full outward positions by means of the pressure of the ejector wheels 70, will be maintained in this outer position with their forward ends flush with the surface of the drum by means of the sanding quadrant 72. As the drum surface passes under the sand-box 73, the dry sand contained in the latter will scour the surfaces of the spacer-blocks 36 and plungers 43 of any adhering traces of clay, whereby these surfaces will be dried and polished ready for their next brick-forming operation. After passing the sand-boxes 73, the plungers 43 will ride off of the upper end of the sanding quadrant 72 and return to their normal or inward position in which they will remain until they strike the cam edge 65 of the gauge quadrants 62. By means of these quadrants they will be forced outward to their proper gauged positions and maintained there during their movements across the feed-box 22 to gauge or measure the quantity of clay entering each pocket.

By reason of the fact that the gauge quadrant 62 and pressure wheels 67 are independently adjustable, it is possible to vary independently the size of the finished brick and the compression which has been applied to that brick. Since the pressure wheels 67 determine the outward position of the plungers 43, it will be seen that it is possible to vary the size of the finished brick by adjusting the pressure member 57 inward or outward in the spider arm 50. This range of adjustment is designed to be sufficient to permit the machine to produce bricks of varying thickness and ranging from flat tile up to ordinary paving bricks. The adjustment is effected by loosening the set-screws 56' and bolts 60 and setting the gauge screws or abutment screws 59 at the desired position, after which the set-screws 56' and bolts 60 are again tightened to maintain the parts in this adjusted position. The compression applied to the brick in the forming operation will depend upon the position of the gauge quadrant 62 with relation to the pressure wheels 67. If the outer surface of this quadrant be almost in line with the outer surfaces of the pressure wheels 67 it is clear that the pressing movement of the plungers 43 and consequently the compression of the brick will be very slight. On the other hand if the gauge quadrant 62 be moved radially inward to lie a considerable distance back of the outer surface of the pressure wheels 67, the forming movements of the plungers 43 will be proportionately increased and the compression applied to the bricks increased in the same ratio. This adjustment of the pressure quadrant 62 may be effected by means of the bolt and slot connections 63, 63', with the pressure element 57, and the bolt and slot connections 64, 64', with the spider arm 51. While it is, of course, true that the gauge quadrant 62 will form a true arc concentric with the shaft 29 in only one adjusted position, the variation from this truly arcuate form will be so slight as to be immaterial to the range of adjustment necessary to the successful operation of the machine.

It is sometimes desirable that the faces of the brick have thereon some legend or other device such as the manufacturer's name, either in intaglio or in relief, or that recesses or lugs be formed, as is commonly the case in paving blocks or bricks. This result may readily be obtained by the use of my machine by using suitable dies formed in or attached to the forming surfaces of the plungers 43. Thus in Fig. 16 I have illustrated a pair of die-plates 101 secured to the faces of the plungers 43 and having a pair of apertures therein suitable for forming lugs upon the inner faces of the bricks. It is obvious that various other forms of die-plates may be used to produce any desired design upon the faces of the bricks.

From the foregoing it will be understood that I have provided a simple form of brick-making machine capable of handling stiff plastic clay and of forming the same into bricks of any desired size and under any desired compression, within reasonable limits. It will be further understood that the bricks formed in my machine will be free of laminations, and of a high commercial grade. It will further be understood that it is possible by the use of die-plates upon the forming plungers to produce upon one side of the bricks, during the forming operation, any desired legend or other device. I have illustrated in the drawings a preferred embodiment of my machine comprising a pair of opposed forming drums 28, but it will be understood that the action of these drums is entirely independent, each drum merely serving as a rotatable pressure element for the opposite drum. A further advantage of this double drum construction lies in the fact that it is possible to produce practically double the number of bricks with the single hopper, feed-box and feeding devices, and furthermore, the pressures on the machine are balanced by the use of the opposed drums. It will readily be understood, however, that if the sacrifice of these advantages appears desirable for any reason, the machine may be constructed with a single drum, the opposite drum being replaced by any desired form of rotatable or stationary pressure element.

By changing the forms of the dies used this machine may be used for briquetting materials of all kinds, such as coal, sawdust and the like, by properly preparing the same such as by placing it in a plastic state.

While I have shown and described in considerable detail one specific embodiment of my invention, it is to be understood that this my showing and description is illustrative only, and for the purpose of making my invention more clear, and that I do not regard the invention as limited to these details of construction or operation, nor to any of them, except in so far as I have included such limitations within the terms of the following claims, in which it is my intention to claim all novelty inherent in my invention as broadly as is possible in view of the prior art.

What I claim as new and desire to secure by Letters Patent is:

1. In combination, a feed-box adapted to contain plastic material, a hollow rotatable drum mounted in operative relation to the said feed-box and having brick-forming pockets in its periphery, radial plungers slidable within the said pockets, said plungers having their inner ends projecting through the inner surface of the said drum, yielding means for maintaining said plungers normally in their extreme inward position, a radially adjustable gauge surface mounted within the said drum opposite the said feed-box and acting upon the projecting ends of the said plungers to maintain them in pre-determined position during the passing of the pockets through the feed-box, an abutment surface against which the said pockets are adapted to roll after they have been filled from the said feed-box, a pressure wheel mounted within the said drum opposite the said abutment surface, said pressure wheel being adapted to roll against the inner ends of the said plungers to force the same outwardly, and independent means for effecting a radial adjustment of said pressure wheel.

2. In combination, a stationary shaft, a hollow rotatable drum journaled thereon, brick-forming pockets carried by the periphery of the said drum, a feed-box mounted in operative relation to the said pockets and adapted to feed plastic material thereto, radial plungers slidable within the said pockets, said plungers having their inner ends projecting through the inner surface of the said drum, a pair of stationary radial arms carried by the said stationary shaft, one of said arms being adjustable in length, a gauge arc supported by the said arm and having contact with the inner ends of the said plungers opposite the said feed-box to gauge the position of the plungers during their passage therethrough, means for adjusting said gauge radially upon said arm, an abutment surface against which said pockets are adapted to roll after they have been filled from the said feed-box, said abutment surface lying opposite said adjustable arm, and a pressure wheel carried in the outer end of said adjustable arm and adapted to force the said plungers outwardly towards the said abutment surface.

3. In combination, a stationary shaft, a hollow rotatable drum journaled thereon, and having brick-forming pockets in its periphery, a feed-box mounted in operative relation to the said brick-forming pockets and adapted to feed plastic material thereto, plungers radially slidable within said pockets, means for normally maintaining said plungers at the limit of their inward movements, a four-armed spider mounted upon the said stationary shaft within the said drum, a gauge quadrant carried by two arms of said spider opposite the said feed-box and adapted to bear against the inner ends of the said plungers to maintain the latter in pre-determined positions during their passage through the feed-box, means for adjusting said quadrant radially inward upon the said arms, a rolling abutment surface adapted to roll against the said plungers when the pockets have been filled, said abutment surface lying opposite the trailing end of said gauge quadrant, a pressure member carried by the arm which supports the last-named end of said quadrant, means for adjusting said pressure member radially inward or outward to determine the throw of the said plungers, an ejector member carried by the next adjacent trailer arm of said spider and adapted to force the said plungers outwardly to the full limit of their outward movement to eject the formed bricks from the pockets, a sanding quadrant extending between the said last-named arm and the fourth arm of the said spider and acting to maintain the said plungers in their full outward positions, and a sand-box operatively related to the periphery of the said drum opposite the said sand-box quadrant.

4. In combination, a feed-box adapted to contain plastic material, a rotatable drum having brick-forming pockets in its periphery, radially slidable plungers operating within the said pockets, an abutment surface against which the said pockets are adapted to roll after having been filled from the said feed-box, means for forcing the said plungers outward as they pass the said abutment surface, whereby the plastic material within the pockets is compressed, means for forcibly withdrawing the said plungers from the formed brick in the outer ends of the said pockets, whereby the vacuum seal between the ends of the plungers and the faces of the bricks is broken, and means for again forcing the said plungers outwardly to eject the said bricks from their pockets.

5. A brick-forming drum comprising in combination a pair of spaced concentric disks, radial spacer blocks extending between the opposed inner faces of the said disks and flush with their peripheries, said spacer-blocks being spaced apart around the circumference of the disks, whereby there is formed a plurality of radially extending pockets, radial partition members dividing the said pockets, and radial plungers mounted between adjacent spacer-blocks and having their outer ends slotted to receive the said partition members.

6. A brick-forming drum comprising a pair of spaced concentric wheels, spacer-blocks extending between the said wheels and flush with their outer surfaces, said spacer-blocks being separated to form radial pockets, partition plates dividing the outer ends of the said pockets, said partition plates lying in radial planes, a plunger slidable in each radial pocket and having its outer end slotted radially to receive a partition plate, compression springs mounted between the inner edges of said partition plates and the inner ends of said plungers, and means for limiting the inward movement of said plungers.

7. A brick-forming machine comprising a movable surface provided with brick-forming pockets, means for feeding plastic material thereto, plungers slidable within said pockets, an abutment surface adapted to contact with said movable surface after said pockets have been filled, means for forcing said plungers outward as they pass the abutment surface, thereby compressing the plastic material in the pockets, means for forcibly retracting the plungers, whereby the vacuum seal between the ends of the plungers and the faces of the brick is broken, and means for again forcing the said plungers outwardly to eject the said bricks from their pockets.

8. In the process of continuously forming plastic articles wherein a plastic material is fed into a mold chamber and compressed therein by a movable plunger, the improvement which consists in forcibly retracting the plunger from the compressed article, thereby breaking the vacuum seal between the end of the plunger and the face of the article while retaining the article in the mold chamber and subsequently forcing the plunger against the article to eject it from the mold chamber.

WILLIAM L. WAKEFIELD.